United States Patent [19]
Sung

[11] Patent Number: 5,487,149
[45] Date of Patent: Jan. 23, 1996

[54] COMMON CONTROL REDUNDANCY SWITCH METHOD FOR SWITCHING A FAULTY ACTIVE COMMON CONTROL UNIT WITH AN INACTIVE SPARE COMMON CONTROL UNIT

[75] Inventor: Ki Y. Sung, Seoul, Rep. of Korea

[73] Assignee: Hyundai Electronics Industries Co., Inc., Rep. of Korea

[21] Appl. No.: 366,262

[22] Filed: Dec. 29, 1994

[30] Foreign Application Priority Data

Dec. 29, 1993 [KR] Rep. of Korea ............... 93-30521

[51] Int. Cl.⁶ .................................................. G06F 11/00
[52] U.S. Cl. .................. 395/182.08; 395/184.01; 364/268.3; 364/DIG. 1
[58] Field of Search ............... 395/575; 371/11.1, 371/11.2, 11.3, 7, 8.1, 9.1; 364/268, 268.1, 268.3, 268.8

[56] References Cited

U.S. PATENT DOCUMENTS

| | | | |
|---|---|---|---|
| 3,890,493 | 6/1975 | Burtness et al. | 235/153 AE |
| 4,358,823 | 11/1982 | McDonald et al. | 371/9.1 |
| 4,371,754 | 2/1983 | De et al. | 371/9.1 |
| 4,455,601 | 6/1984 | Griscom et al. | 364/200 |
| 4,634,110 | 1/1987 | Julich et al. | 371/11.3 |
| 4,797,884 | 1/1989 | Yalowitz | 371/9.1 |
| 4,823,256 | 4/1989 | Bishop et al. | 364/200 |
| 5,185,693 | 2/1993 | Loftis et al. | 395/575 |
| 5,196,734 | 3/1993 | Han . | |
| 5,345,438 | 9/1994 | Ozaki | 371/8.1 |

Primary Examiner—Robert W. Beausoliel, Jr.
Assistant Examiner—Joseph E. Palys
Attorney, Agent, or Firm—Merchant, Gould, Smith, Edell, Welter & Schmidt

[57] ABSTRACT

A common control redundancy switch method capable of, when an error occurs at an active common control unit, replacing the card at which the error occurs by a spare card, thereby performing operations as usual without affecting the overall network and, thus, reducing the time taken for repair during the stop of the system caused by the error. When a local control task of an active common control unit receives a switch message from a network management system via a configuration control task, it discriminates whether an inactive common control unit is at a switchover enable state. Upon receiving the switch message, an inactive common control unit transmits a response message to the switch message to a local control task of the active common control unit. When the local control task of the active common control unit receives the response message, a performance monitor gives a hardware initiated alarm informing of the initiation of the switchover routine. Where the inactive common control unit 20 is switched from the inactive state into the active state, it generates an activity switch result message informing of the switchover and sends it to the network management system.

6 Claims, 7 Drawing Sheets

5,487,149

COMMON CONTROL REDUNDANCY SWITCH METHOD FOR SWITCHING A FAULTY ACTIVE COMMON CONTROL UNIT WITH AN INACTIVE SPARE COMMON CONTROL UNIT

BACKGROUND OF THE INVENTION

1. Field of the Invention

The present invention relates to a common control redundancy switch method, and more particularly to a common control redundancy switch method capable of, when an error occurs at an active common control unit for managing and controlling a network of a very small aperture terminal system (VSAT), replacing the card at which the error occurs by a spare card, thereby allowing the common control unit to operate as usual.

2. Description of the Prior Art

Referring to FIG. 1, there is illustrated a common control device used to accomplish a conventional common control redundancy switch method. As shown in FIG. 1, the common control device includes a first common control unit 1 and a second common control unit 2 both adapted to manage and control a network of a VSAT. A first monitor processing unit 3 and a second monitor processing unit 4 are also provided. The first monitor processing unit 3 serves to exchange information with a network management system (NMS) and the common control unit 1, serves as an interface of a monitoring processor bus, and serves to achieve a communication of a bit synchronous card (BS) through the monitoring processor bus by utilizing a direct memory access (DMA) system. In similar to the first monitor processing unit 3, the second monitor processing unit 4 serves to exchange information with a network management system (NMS) and the common control unit 2, serves as an interface of the monitoring processor bus, and achieve a communication of the BS through the monitoring processor bus by utilizing the DMA system. The common control device further includes a performance monitor 5 serving as a switch for connecting the currently active one of the common control units 1 and 2 with the bus of the corresponding one of the monitor processing units 3 and 4 so as to achieve a common control redundancy switching operation, a maintenance read-out (MRO) monitor 6 as a monitor for displaying a debug message, and a call record journal (CRJ) monitor 7.

Each of the first and second common control units 1 and 2 includes a card for performing the whole control functions to down-load and store data base and protocol predetermined on a shelf and structured in the NMS, perform initiations of all boards of a district center and end offices, and monitor operating conditions. In each of the first and second common control units 1 and 2, a kernel of a multi-tasking operating system (MTOS) which is a commercial operating system and a software of the common control unit are operated. Each of the first and second common control units 1 and 2 also includes a paged memory pool of total pages of 2 mega bytes so as to manage the protocol software and database down-loaded from the NMS.

In the common control device having the above-mentioned arrangement, however, the overall system can not operate when an error occurs at a part thereof.

For solving such a problem that the overall system or circuit operates normally no longer due to a failure generated at a part thereof, there has been made a proposal of providing a redundant system or circuit to be switched for the failed system or, thereby enabling the overall system or circuit to continuously perform its normal operation. For example, such a proposal is disclosed in U.S. Pat. No. 5,196,734. In accordance with this patent, a cascode current switch latch is provided which is made insensitive to single event upset (SEU) from radiation-induced charge by the addition of two transistors connected thereto, thereby achieving a switching operation. However, this technique is adapted to solve the problems encountered in the field of integrated circuits due to a decrease in transistor size. The technique can not be applied to VSATs driven by digital signals.

SUMMARY OF THE INVENTION

Therefore, an object of the invention is to provide a common control redundancy switch method capable of, when an error occurs at an active common control unit, replacing the card at which the error occurs by a spare card, thereby performing operations as usual without affecting the overall network.

In accordance with the present invention, this object can be accomplished by providing a common control redundancy switch method carried out in a common control device including a pair of common control units each adapted to manage and control a network of a very small aperture terminal system, one of the common control units being normally at an active state and having a first local control task, a first monitor task and a first configuration control task, the other being normally at an inactive state and having a second local control task, a second monitor task and a second configuration control task, a pair of monitor processing units each adapted to exchange information with both a network management system and each corresponding one of the common control unit in a dual-ported ram manner and thereby function as an interface of a monitoring processor bus, and a performance monitor adapted to function as a switch for connecting the currently active one of the common control units with the monitoring processor bus so as to achieve a common control redundancy switching operation, the common control redundancy switch method comprising the steps of: (A1) receiving a switch message from the network management system via the first configuration control task by the first local control task; (A2) receiving the switch message from the first local control task by the inactive common control unit and transmitting a response to the received switch message to the first local control task; (A3) transmitting information about a major error to be corrected in the first local control task to the monitor processing unit corresponding to the active common control unit and thereby executing a switching operation in the performance monitor; (A4) continuously reading interface parts of the performance monitor at intervals of half second by the monitor tasks of the common control units, checking whether respective current states of the common control units have been switched, on the basis of the result of the reading, transmitting the switch result to the network management system when the state of the inactive common control unit has been checked to be switched to its active state; (A5) informing the second configuration control task by the second monitor task of the switch result that the inactive common control unit has been switched to its active state; (A6) informing the first configuration control task by the first monitor task of the switch result that the active common control unit has been switched to its inactive state; and (A7) checking states of operations performed by the active common control unit for the network of the very small aperture terminal system, by the second configuration control task of the inactive common control unit switched to the active state and updating data base of the second configuration control task with the checked operation states.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
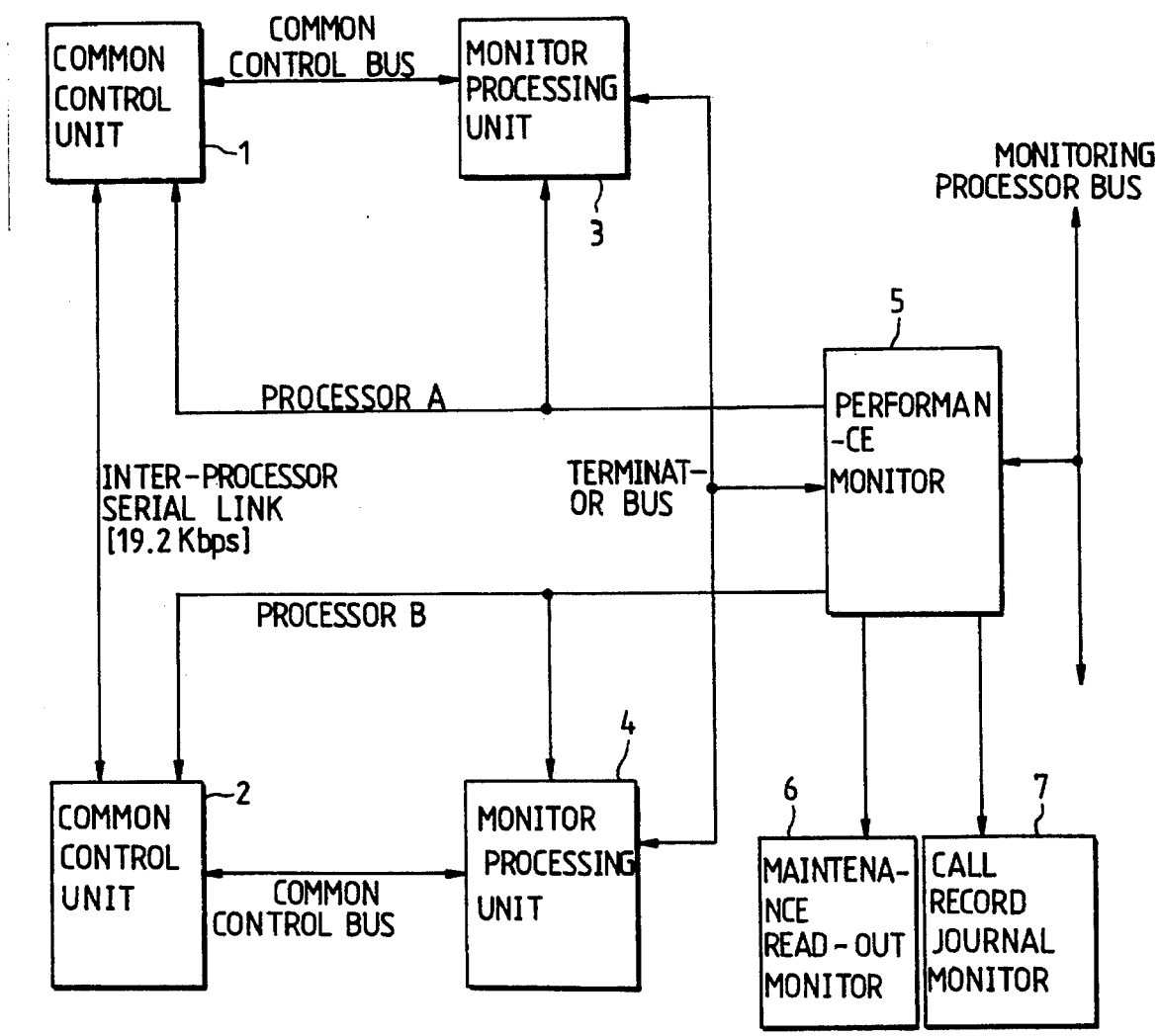
FIG. 1 is a block diagram of a common control device used to accomplish a conventional common control redundancy switch method.
Figure 2:
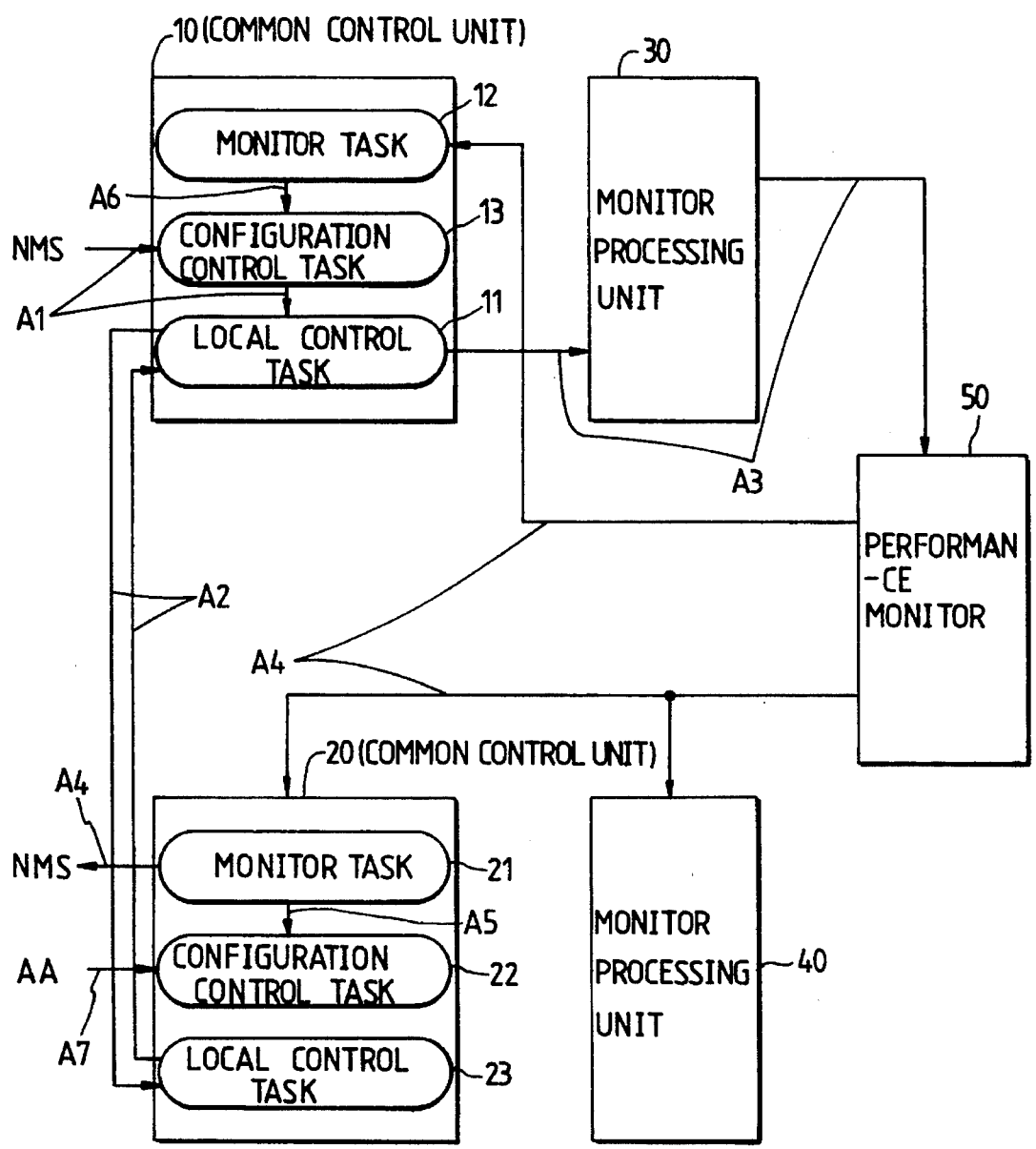
FIG. 2 is a block diagram of a common control device adapted to accomplish a common control redundancy switch method in accordance with the present invention.

FIG. 2 is a block diagram of a common control device adapted to accomplish a common control redundancy switch method in accordance with the present invention. As shown in FIG. 2, the common control device includes a pair of common control units 10 and 20. One of the common control units 10 and 20 is normally at an active state to manage and control a network of a VSAT while the other is normally at an inactive state. For simplicity of the description, the common control unit 10 will be described as being normally at the active state whereas the common control unit 20 will be described as being normally at the inactive state. A pair of monitor processing units 30 and 40 are also provided. The monitor processing unit 30 serves to exchange information with both a NMS and the common control unit 10 in a dual-ported ram manner and thereby function as an interface of a monitoring processor bus. The monitor processing unit 40 serves to exchange information with both the NMS and the common control unit 20 in a dual-ported ram manner and thereby function as the interface of the monitoring processor bus. The common control device further includes a performance monitor 50 serving as a switch for connecting the currently active one of the common control units 10 and 20 with the bus of the corresponding one of the monitor processing units 30 and 40 so as to achieve a common control redundancy switching operation. The active common control unit 10 includes a local control task 11, a monitor task 12 and a configuration control task 13. In similar, the inactive common control unit 20 includes a monitor task 21, a configuration control task 22 and a local control task 23.

The common control redundancy switch method in accordance with the present invention carried out using the above-mentioned common control device will now be described. The common control redundancy switch method includes seven steps, namely, the first step A1 of receiving a switch message from the NMS via the configuration control task 13 of the active common control unit 10 by the local control task 11 of the active common control unit 10, the second step A2 of receiving the switch command from the local control task 11 of the active common control unit 10 by the inactive common control unit 20 and transmitting a response to the received switch command to the local control task 11 of the active common control unit 10, the third step A3 of transmitting information about a major error to be corrected in the local control task 11 to the monitor processing unit 30 and thereby executing a switching operation in the performance monitor 50, the fourth step A4 of continuously reading interface parts of the performance monitor 50 at intervals of half second by the monitor tasks 12 and 21 of the common control units 10 and 20, checking whether respective current states of the common control units 10 and 20 have been switched, on the basis of the result of the reading, transmitting the switch result to the NMS when the state of the inactive common control unit 20 has been checked to be switched to an active state, the fifth step A5 of informing the configuration control task 22 by the monitor task 21 of the switch result that the inactive common control unit 20 has been switched to its active state, the sixth step A6 of informing the configuration control task 13 by the monitor task 12 of the switch result that the active common control unit 10 has been switched to its inactive state, and the seventh step A7 of checking states AA of operations performed by the common control unit 10 for the network of the VSAT, by the configuration control task 22 of the common control unit 20 switched to the active state and updating data base of the configuration control task 22 with the checked operation states AA.

Figure 3:
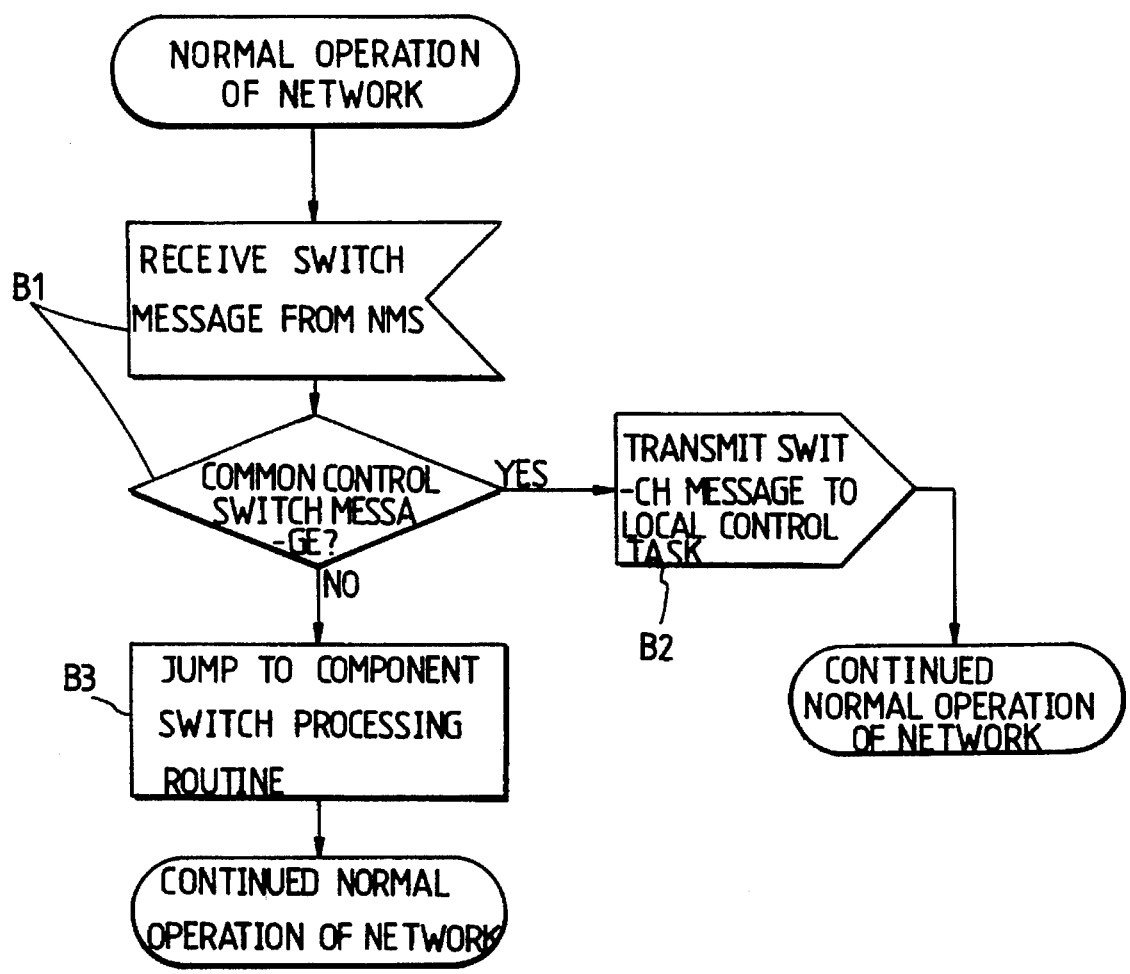
FIG. 3 is a flow chart illustrating the procedure of receiving a common control switch message from an NMS and transmitting it from an active configuration control task to an active local control task in accordance with the common control redundancy switch method of the present invention.

FIG. 3 is a flow chart illustrating the procedure of receiving the common control switch message from the NMS and transmitting it from the configuration control task 13 to the local control task 11 at the first step A1 of the common control redundancy switch method shown in FIG. 2. This procedure includes three steps, namely, the first step B1 of receiving an activity switch message from the NMS by the active configuration control task 13 and checking whether the received activity switch message is a switch message for the common control unit 10, the second step B2 of transmitting the switch message to the local control task 11 when the received activity switch message is the switch message for the common control unit 10, and the third step B3 of jumping the procedure to a component switch processing routine when the received activity switch message is not the switch message for the common control unit 10.

Figure 4:
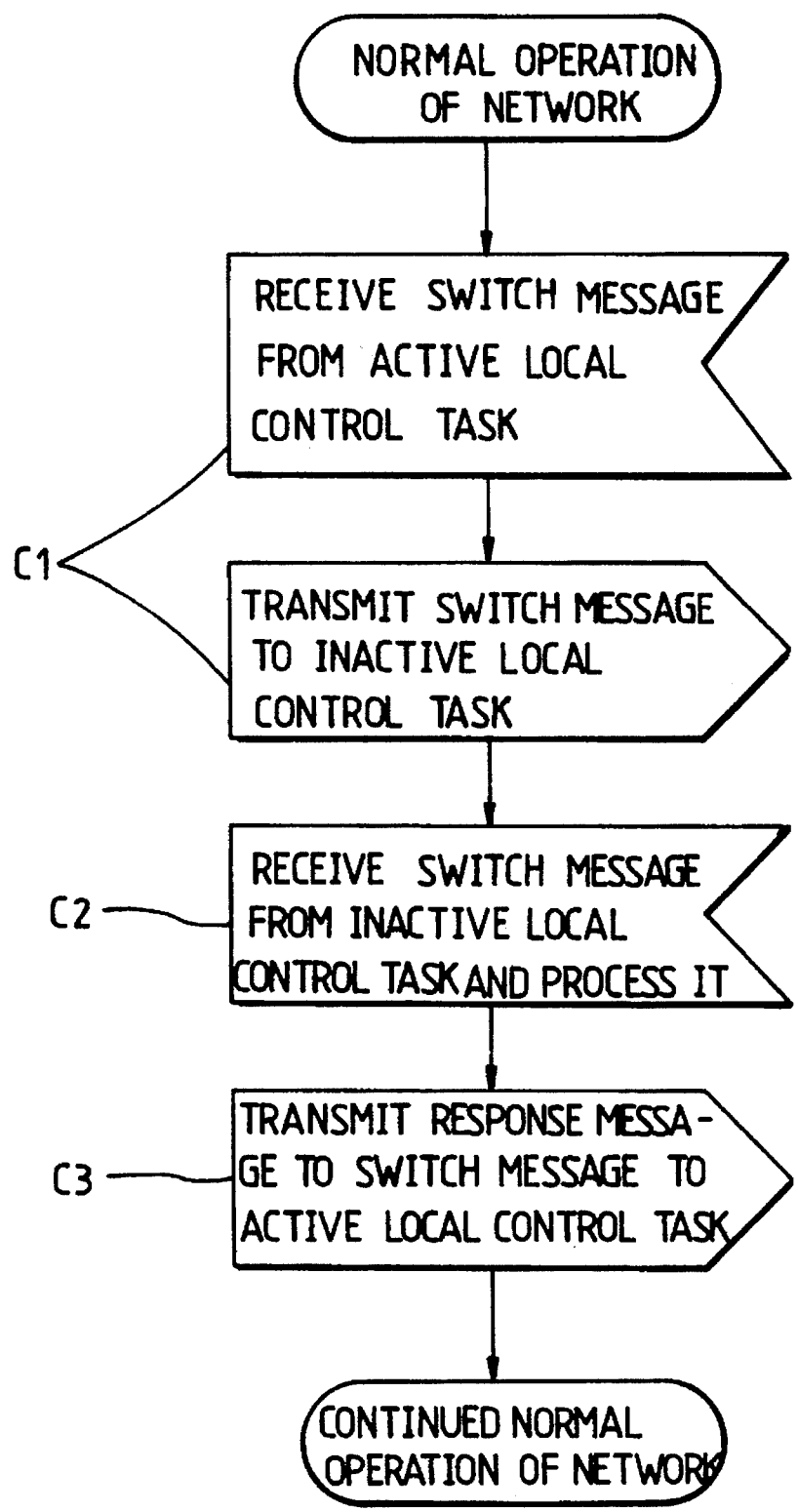
FIG. 4 is a flow chart illustrating the procedure of receiving the switch message and processing it by the active local control task in accordance with the common control redundancy switch method of the present invention.

FIG. 4 is a flow chart illustrating the procedure of receiving the switch message and processing it by the active local control task 11 at the second step A2 of the common control redundancy switch method shown in FIG. 2. As shown in FIG. 4, the procedure includes three steps, namely, the first step C1 of receiving the switch message by the active local control task 11 and transmitting the received switch message to the inactive local control task 23, the second step C2 of processing the received switch message by the inactive local control task 23, and the third step C3 of transmitting a response message to the switch message to the active local common control task 11.

Figure 5:
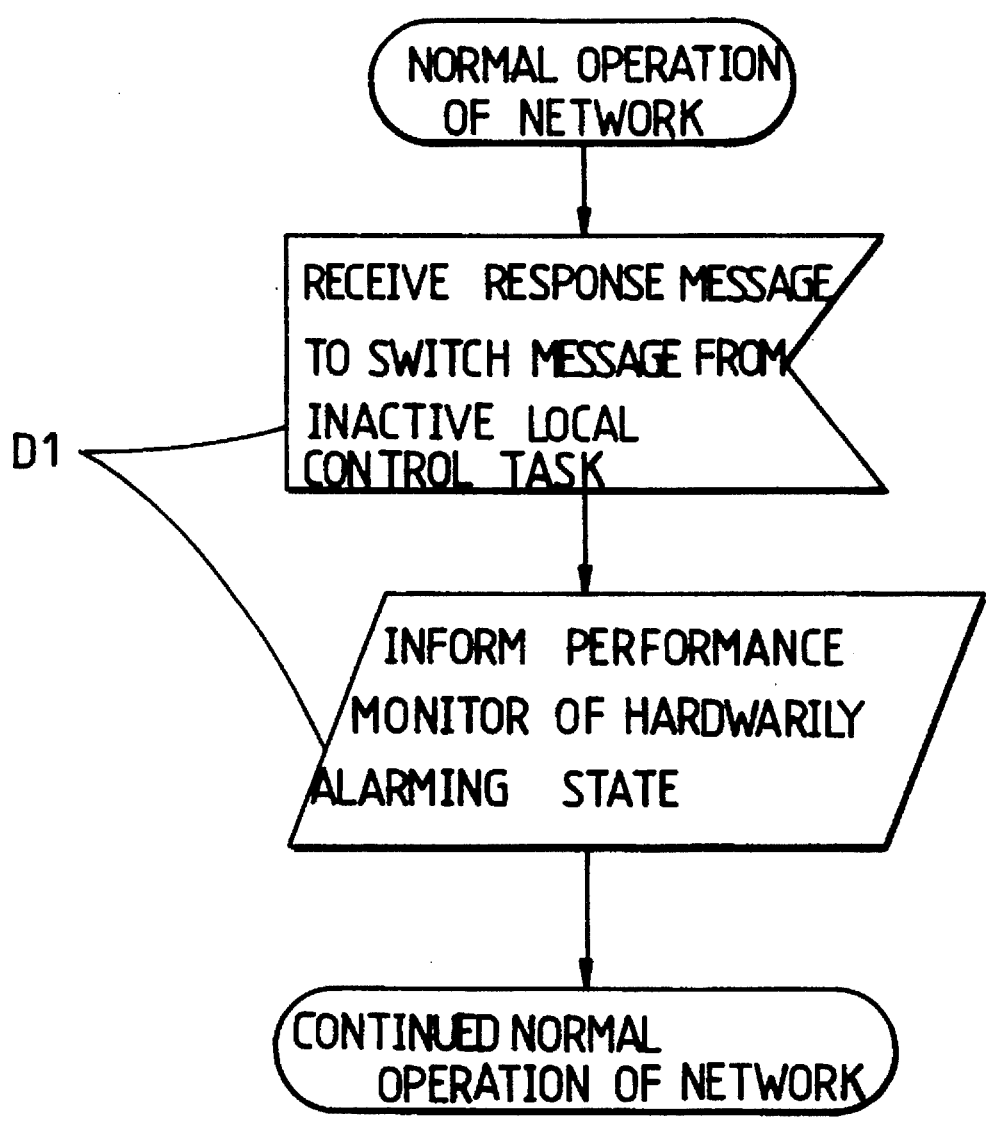
FIG. 5 is a flow chart illustrating the procedure of processing a response message to the common control switch message by an active common control unit in accordance with the common control redundancy switch method of the present invention.

FIG. 5 is a flow chart illustrating the procedure of processing the response message to the common control switch message by the active common control unit 10 at the third step A3 of the common control redundancy switch method shown in FIG. 2. As shown in FIG. 5, the procedure includes the step D1 of receiving the response message to the common control switch message from the inactive local control task 23 by the active local control task 11 and informing the performance monitor 50 of a hardwarily alarming state of the active common control unit 10 via the monitor processing unit 30.

The operations of FIGS. 3 to 5 are carried out under a condition that the network operates normally.

Figure 6:
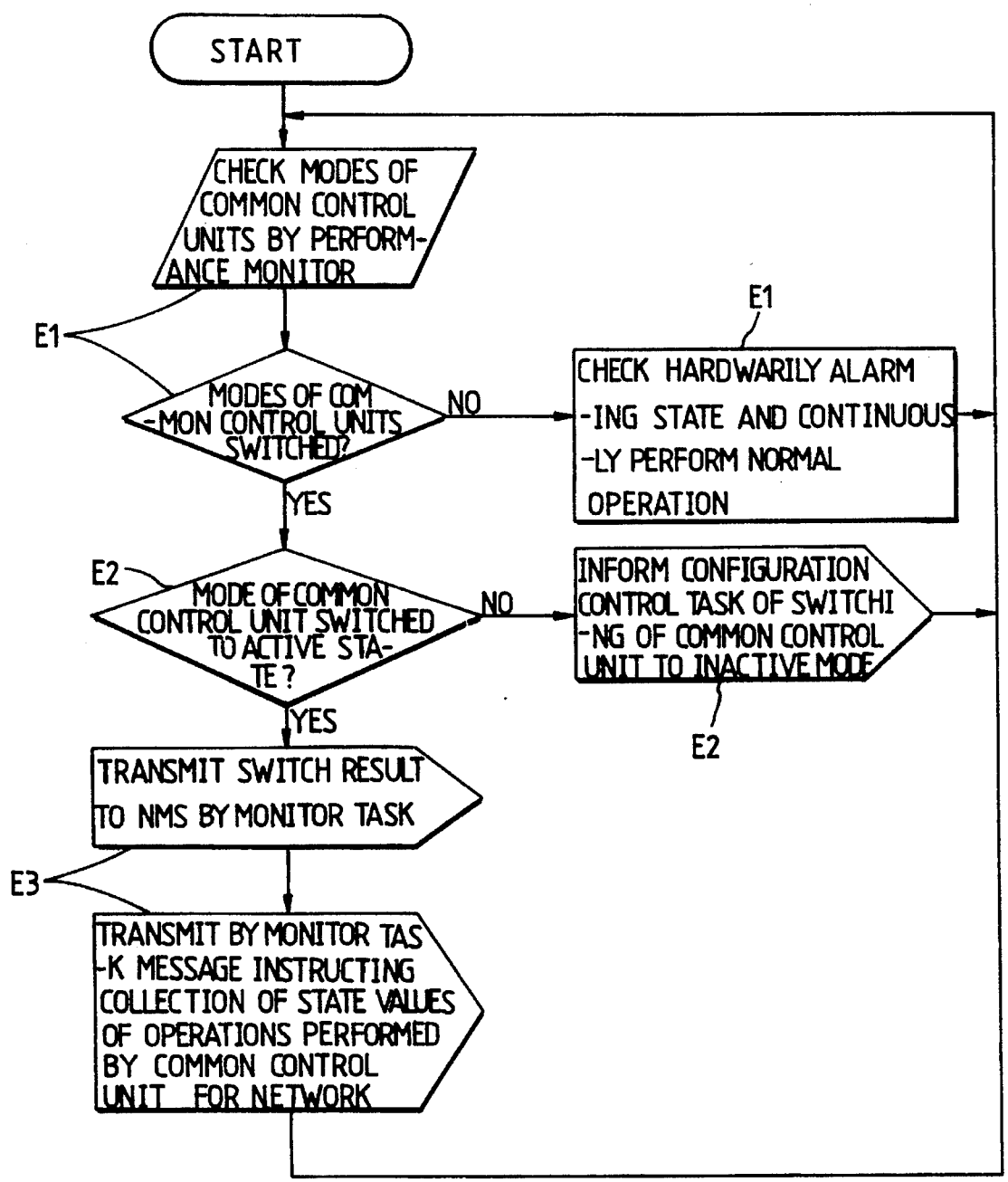
FIG. 6 is a flow chart illustrating the procedure of periodically checking modes of the common control units in accordance with the common control redundancy switch method of the present invention.

FIG. 6 is a flow chart illustrating the procedure of periodically checking modes of the common control units 10 and 20 at the steps A4 to A6 shown in FIG. 2. As shown in FIG. 6, the procedure includes three steps, namely, the first step E1 of checking the modes of the common control units 10 and 20, determining whether the modes of the common control units 10 and 20 have been switched, on the basis of the result of the checking, and checking the hardwarily alarming state when the modes of the common control units 10 and 20 have not been determined to be switched, the second step E2 of determining, when the modes of the common control units 10 and 20 have been switched, whether the currently switched mode corresponds to the active state, and informing the configuration control task 13 by the monitor task 12 of that the common control unit 10 has been switched to its inactive mode, and the third step E3 of transmitting the switch result to the NMS by the monitor task 21 when the switched mode corresponds to the active state, transmitting a message for collection of state values of operations of the network to the configuration control task 13, and returning the procedure to the first step E1.

For the common control automatic switch operation, the monitor tasks 12 and 21 monitor continuously operational nodes of the common control units 10 and 20. These monitoring operations of the monitor tasks 12 and 21 are controlled by the performance monitor 50. When the monitor tasks 12 and 21 detect switching of the corresponding operational nodes from an inactive state into an active state, they operate to generate an activity switch result message informing of an occurrence of a switchover at a data interface equipment, transmit the activity switch result message to the NMS, transmit a message instructing collection of values indicative of states AA of operations performed by the common control unit 10 for the network to the configuration control task 22, and perform a processing for collecting the state values of the network. Where the operation mode is switched from the active state into the inactive state, the monitor tasks 12 and 21 operate to inform the configuration control task 13 of the inactive mode state.

Figure 7:
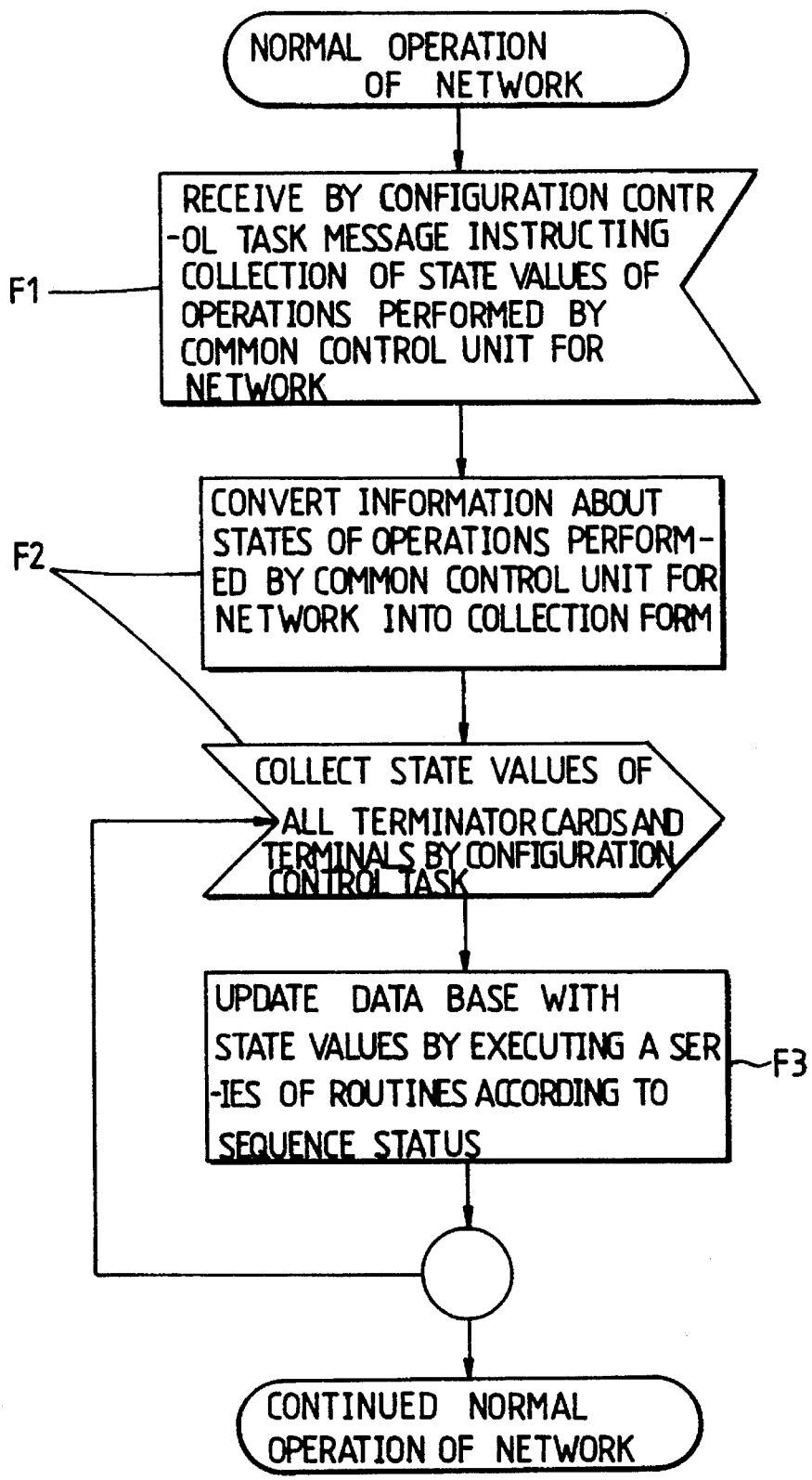
FIG. 7 is a flow chart illustrating the procedure of updating data base with collected values indicative of states of operations performed by the active common control unit for a network in accordance with the common control redundancy switch method of the present invention.

FIG. 7 is a flow chart illustrating the procedure of updating the data base with the collected values indicative of states AA of operations performed by the common control unit 10 for the network at the seventh step A7 shown in FIG. 2. This procedure includes three steps, namely, the first step F1 of receiving, by the configuration control task 22, the message instructing the correction of the state values of the network from the monitor task 21 under a condition that the state values of the network are to be collected, namely, when the modes of common control units 10 and 20 have been switched, the second step F2 of converting information about operation states AA of the network into a state value collection form and collecting state values for all terminator cards and nodes of terminals, and a third step F3 of executing a series of routines in accordance with a sequence status SEQ-STATUS. All the operations in this procedure are carried out under a condition that the network operates normally.

When a critical error occurs at the active one of the common control units for managing and controlling the network of the VSAT, the present invention copes with the error by use of a spare card. In other words, when the local control task 11 of the active common control unit 10 receives a switch message from the NMS via the configuration control task 13, it discriminates first whether the inactive common control unit 20 is at a switchover enable state. When the inactive common control unit 20 can not be switched over, information indicative of a switchover disable state of the inactive common control unit 20 is stored in an activity-switch-result message. The resultant message is then transmitted to the NMS. When the inactive common control unit 20 can be switched over, a switch message is transmitted to the local control task 23 of the inactive common control unit 20.

Upon receiving the switch message, the inactive common control unit 20 transmits a response message to the common control switch message to the local control task 11 of the active common control unit 10. When the local control task 11 receives the response message to the switch message, the performance monitor 50 gives hardwarily the alarm informing of initiation of the switchover routine. Where the inactive common control unit 20 is switched from the inactive state into the active state, it generates an activity switch result message informing of the switchover of the data interface equipment and sends it to the NMS. The inactive common control unit 20 also transmits a message instructing collection of state values AA of operations performed by the common control unit 10 for the network to the configuration control task 22, so as to collect the state values AA. On the other hand, where the active common control unit 10 is switched from the active state into the inactive state, it operates to inform the configuration control task 13 of the inactive mode state.

By the alarm hardwarily given by the performance monitor 50, the inactive common control unit 20 is converted into the active mode. The converted mode of the inactive common control unit 20 is detected by the monitor task 21 of the inactive common control unit 20.

As apparent from the above description, the present invention provides a common control redundancy switch method capable of, when an error occurs at an active common control unit, replacing the card at which the error occurs by a spare card, thereby performing operations as usual without affecting the overall network. Accordingly, it is possible to reduce the time taken for repair during the stop of the system caused by the error.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A common control redundancy switch method carried out in a common control device including a pair of common control units each adapted to manage and control a network of a very small aperture terminal system, one of the common control units being normally at an active state and having a first local control task, a first monitor task and a first configuration control task, the other being normally at an inactive state and having a second local control task, a second monitor task and a second configuration control task, a pair of monitor processing units each adapted to exchange information with both a network management system and each corresponding one of the common control units in a dual-ported ram manner and thereby function as an interface of a monitoring processor bus, and a performance monitor adapted to function as a switch for connecting the currently active one of the common control units with the monitoring processor bus so as to achieve a common control redundancy switching operation, the common control redundancy switch method comprising the steps of:

(A1) receiving a switch message from the network management system via the first configuration control task by the first local control task;

(A2) receiving the switch message from the first local control task by the inactive common control unit and transmitting a response to the received switch message to the first local control task;

(A3) transmitting information about a major error to be corrected in the first local control task to the monitor processing unit corresponding to the active common control unit and thereby executing a switching operation in the performance monitor;

(A4) continuously reading interface parts of the performance monitor at half second intervals by the monitor tasks of the common control units, checking whether respective current states of the common control units have been switched, on the basis of the result of the reading, transmitting the switch result to the network management system when the state of the inactive common control unit has been checked to be switched to its active state;

(A5) informing the second configuration control task by the second monitor task of the switch result that the inactive common control unit has been switched to its active state;

(A6) informing the first configuration control task by the first monitor task of the switch result that the active common control unit has been switched to its inactive state; and (A7) checking states of operations performed by the active common control unit for the network of the very small aperture terminal system, by the second configuration control task of the inactive common control unit switched to the active state and an updating data base of the second configuration control task with the checked operation states.

2. A common control redundancy switch method in accordance with claim 1, wherein the step (A1) comprises the steps of:

(B1) receiving an activity switch message from the network management system by the first configuration control task and checking whether the received activity switch message is a switch message for the active common control unit;

(B2) transmitting the switch message to the first local control task when the received activity switch message is the switch message for the active common control unit; and (B3) jumping the procedure to a component switch processing routine when the received activity switch message is not the switch message for the active common control unit.

3. A common control redundancy switch method in accordance with claim 1, wherein the step (A2) comprises the steps of:

(C1) receiving the switch message by the first local control task and transmitting the received switch message to the second local control task;

(C2) processing the received switch message by the second local control task; and (C3) transmitting a response message to the switch message to the first local common control task.

4. A common control redundancy switch method in accordance with claim 1, wherein the step (A3) comprises the step of receiving the response message to the common control switch message from the second local control task by the first local control task and informing the performance monitor of a hardware alarming state of the active common control unit via the monitor processing unit.

5. A common control redundancy switch method in accordance with claim 1, wherein the steps (A4) to (A6) are carried out by repeating the steps of:

(E1) checking modes of the common control units, determining whether the modes of the common control units have been switched, on the basis of the result of the checking, and checking the hardware alarming state when the modes of the common control units have not been determined to be switched;

(E2) determining, when the modes of the common control units have been switched, whether the currently switched mode corresponds to the active state, and informing the first configuration control task by the first monitor task of that the active common control unit has been switched to its inactive state; and (E3) transmitting the switch result to the network management system by the second monitor task when the switched mode corresponds to the active state, and transmitting a message for collection of state values of operations of the network to the first configuration control task.

6. A common control redundancy switch method in accordance with claim 1, wherein the step (A7) comprises the steps of:

(F1) receiving, by the second configuration control task, a message instructing correction of state values of the operations performed by the active common control unit for the network from the second monitor task under a condition that the state values are to be collected, namely, when the modes of common control units have been switched;

(F2) converting information about the states of the operations into a state value collection form and collecting state values for all terminator cards and nodes of terminals; and (F3) executing a series of routines in accordance with a sequence status.

* * * * *

UNITED STATES PATENT AND TRADEMARK OFFICE
CERTIFICATE OF CORRECTION

PATENT NO. : 5,487,149

DATED : January 23, 1996

INVENTOR(S) : Ki Y. Sung

It is certified that error appears in the above-identified patent and that said Letters Patent is hereby corrected as shown below:

```
Column 7, line 51, delete "an" after "and"
Column 7, line 51, insert --a-- after "updating"
```

Signed and Sealed this

Thirtieth Day of July, 1996

Attest:

BRUCE LEHMAN

*Attesting Officer*  *Commissioner of Patents and Trademarks*